July 11, 1933.  G. A. LYON  1,917,267
PROCESS OF MAKING AUTOMOBILE BUFFERS
Original Filed Oct. 23, 1924  2 Sheets-Sheet 1

INVENTOR
George Albert Lyon
BY
Newell & Spencer
ATTORNEYS

July 11, 1933.  G. A. LYON  1,917,267
PROCESS OF MAKING AUTOMOBILE BUFFERS
Original Filed Oct. 23, 1924   2 Sheets-Sheet 2
Fig.12.
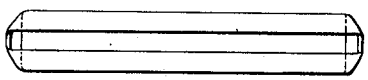
Fig.14.
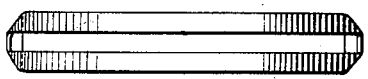
Fig.13
Fig.15.
Fig.18.
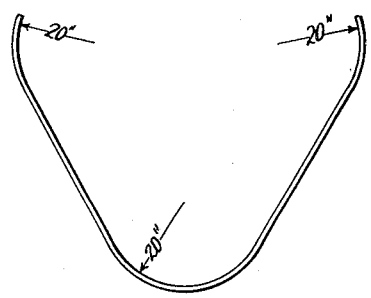
Fig.16.
Fig.17
Fig.21.
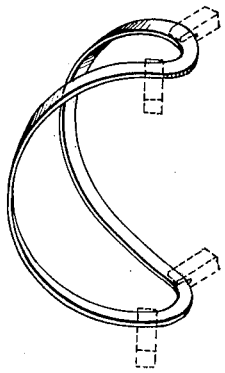
Fig.19.
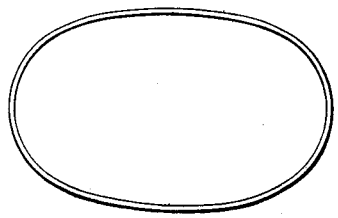
Fig.22.
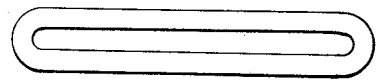
Fig.20
INVENTOR
George Albert Lyon
BY
ATTORNEYS Patented July 11, 1933

1,917,267

UNITED STATES PATENT OFFICE

GEORGE ALBERT LYON, OF ALLENHURST, NEW JERSEY

PROCESS OF MAKING AUTOMOBILE BUFFERS

Application filed October 23, 1924, Serial No. 745,432. Renewed October 25, 1930.

This invention relates to automobile buffers and to processes of making automobile buffers or the parts thereof, and is herein shown as embodied in and as carried out in connection with the manufacture of integral double-bar buffers, whether of the type in which the bars are arranged one above the other, or of the type in which they are arranged one behind the other. It will be understood, however, that the invention is not restricted to the illustrated embodiment nor to the particular number or order of steps herein described, but that many of its novel features have quite general applicability and utility in the art to which the invention relates.

A general object of the invention is to produce an automobile buffer of as good or better construction, with respect both to quality and to finish, as any heretofore made by other processes, but at a very materially reduced cost. The invention is particularly directed to the production of integral double-bar automobile buffers, and aims not only to facilitate the formation and finishing of such buffers but to make them more uniform both in respect to their finished appearance and in respect to their structural strength, dimensions and adaptability for the purposes for which they are intended.

The invention as herein shown is particularly applicable to the manufacture of integral double-bar buffers having end folds of the type disclosed in my United States Letters Patent No. 1,474,273, granted November 13, 1923, Buffer construction, but while its utility is particularly marked in the formation of such an integral double-bar buffer, it will be apparent that many of the advantages obtained from the process herein disclosed, when applied to buffers of the end-fold type, will equally be obtained in the manufacture of buffers of other forms.

An important object of the invention is a process of making automobile buffers which will lend itself particularly to the employment of machinery in carrying out the various steps; in other words, to substitute automatic operations, as far as possible, for manual operations.

Other objects and important features of the invention will appear from the following description and claims when considered in connection with the accompanying drawings which illustrate somewhat diagrammatically the various steps of the novel process of making the improved buffer of the present invention, and in which Fig. 1 illustrates the shape of the piece of strip steel from which the buffer is to be formed when the surface grinding of the strip or bar is preferably to be done before flexing and welding;

Fig. 12 is a front view, of a finished integral double-bar, straight front buffer formed by the previously illustrated steps;

Fig. 13 is a top plan view of the finished straight front buffer shown in Fig. 12;

Fig. 14 is a front view and Fig. 15 is a plan view of a finished bowed front buffer made from a strip having an initial permanent bend, as shown in Fig. 4;

Fig. 16 is a front view and

Fig. 17 is a plan view of another form of buffer that can advantageously be made by the process of the present invention;

Fig. 18 illustrates the preliminary bending step employed when utilizing the process of the present invention to form a straight front buffer having rearwardly curved portions between the straight front portions of the buffer bars and the end folds;

Fig. 19 illustrates the shape of the ring formed by welding the ends of the strip shown in Fig. 18;

Fig. 20 is a plan of the finished buffer formed from the strip shown in Fig. 19;

Fig. 21 shows the bending operation when the process is used for making a buffer of the type shown in Fig. 22; and Fig. 22 is an integral double-bar buffer in which the connections of the ends of the bars are formed by edgewise bending of the bars.

As hereinabove suggested, the invention relates particularly to the production of integral double-bar buffers and the process is herein illustrated and described, both with reference to its utility when used in the production of double-bar buffers of the end-fold type such as shown in Figs. 13, 15 and 20, or of the edge-bend type such as shown in Fig. 22, in which the bars of the buffer are in edgewise parallelism, and also with reference to its utility when used in the formation of double-bar buffers of the front and back bar loop type such as shown in Fig. 17. It will be understood, however, that the invention is not restricted to the particular buffer configurations herein shown.

When employing the novel process of the present invention to form an integral double-bar buffer of any of the types herein shown, a strip of steel of the cross-sectional form and dimensions desired to make the buffer design is cut substantially to the length required to form the buffer, provision being made for any loss of length in the welding operation hereinafter to be described. This steel may either come from the steel maker in the hardened and tempered condition, that is to say already heat-treated, or it may be hardened and tempered by the buffer manufacturer as an initial step in the making of the buffer. In either case it is usually necessary to grind or otherwise remove the scale from one or more of the faces of the strip preparatory to plating. Usually both the front and back faces are ground, although I may grind only the front face of the buffer where considerations of cost are a controlling factor.

Figure 2:
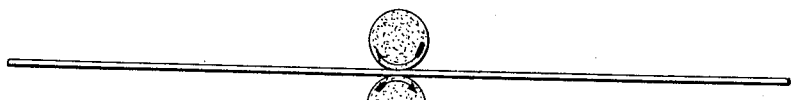
Fig. 2 illustrates diagrammatically the mode of surface grinding the strip of Fig. 1 to remove the scale and give it a surface suitable for plating.

This grinding operation in the case of a buffer which has a substantially straight front may be performed as shown in Fig. 2 while the strip is still in its flat condition, both faces being ground simultaneously. If it is desired, however, to perform the grinding step after the strip has been flexed into ring form and its ends welded together, then it is preferable, in such case, to form in the ends of the strip slight permanent bends substantially to the radius of the ring which the strip forms when it is flexed until its ends are brought together. This avoids the formation of a flat portion at the point where the ends come together or where these ends project beyond the clamping jaws of the welding machine, as such flat portion would destroy the circular shape and interfere with uniform finish grinding of the surfaces when this grinding is done after the strip has been flexed into ring form. This permanent bending of the ends of the strip may be done during the hardening and tempering step. A strip with its ends thus bent is shown in Fig. 3 of the drawings.

Figure 3:
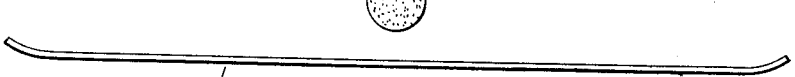
Fig. 3 illustrates the initial permanent end bends which are preferably given to the steel strip when it is intended to do the surface grinding after the strip has been flexed into ring form.

If instead of forming the buffer with its bars substantially straight as shown in Fig. 13, the bars of the finished buffer are to be forwardly bowed, as shown in Fig. 15, there is preferably given to the strip, in addition to the end bends shown in Fig. 3, a permanent camber or bend throughout the bar portion to the radius of curvature of the bow in the finished buffer, as, for example, to an arc of 80'' radius plus or minus for say a $\frac{5}{16}$'' bar, the radius in general depending upon the thickness and length of the strip and its elastic limit. It will be understood, however, that if the finish grinding of the strip preparatory to plating is not to be done after the strip is flexed into ring form, the end bends may be omitted in the bowed strip as well as in the flat strip shown in Fig. 3, and the grinding of the bowed strip may be done while it is simply in its bowed condition.

The material of which buffers of the type herein illustrated and described are made, is preferably spring steel which when hardened and tempered has a high elastic limit so that a real buffer action is obtained in case of collision. As hereinabove suggested, when the buffer has a bowed front there is preferably, and in most cases necessarily, given to the strip an initial permanent camber or bend throughout the bar portion of the buffer to the radius of curvature of the bow in the finished buffer. This radius of curvature will be selected so that the initial curvature given to the strip will be of such an amount in proportion to the thickness and length of the strip as to permit bending of the strip from this curvature or camber to the ring form without exceeding the elastic limit of the material. In practice, this initial curvature will be given to the strip during the hardening and tempering, that is, when it has been heated just above the decalescence point, quenched in some medium to hold the metallurgical construction desired, and then tempered.

To illustrate the use of this preliminary forming operation in its application to the handling of material of various thicknesses in accordance with the present method, if a strip be taken, for example, which has a thickness of $\frac{5}{16}$ of an inch and a length of the usual total length required to make an automobile buffer of one of the types herein shown, which is approximately about 125 5/8″, there would be given to this strip or bar an initial curvature of a radius of, for example, 80″. If, then, this strip or bar is flexed into a ring, it will form a ring having a mean diameter of about 40″. The maximum stress produced in the bar by flexing it into a ring of this diameter, starting with the initial permanent curvature to the 80″ radius, will be well within the elastic limit of buffer steel. If, however, it should be attempted to flex a strip of the length and thickness aforementioned into a ring of 40″ diameter without giving to the strip the initial curvature above described; in other words, flex it from its flat condition, the stress would be beyond the elastic limit of ordinary spring steel.

It will be understood, of course, that if the bar or strip be thicker, for example 3/8″ thick, the initial curvature would have to be on a considerably shorter radius. For a bar or strip of the length above given and of a thickness of 3/8″, the radius would have to be about 52″ to permit flexing into the ring form without exceeding the elastic limit. With a thinner strip, of course, the radius of curvature could be much greater, and if the strip be thin enough or its elastic limit high enough, the initial curvature might be infinite, that is to say, the strip could be bent into ring form from a straight or flat condition without going beyond the elastic limit of the material. If the buffer be of the bowed front type, a considerably thicker strip can be used for the same length than if the buffer be of the straight front type, since in the formation of a buffer of the bowed front type the strip is given an initial permanent arch to the radius of curvature of the bow before it is flexed into ring form, which initial permanent arch permits flexing into ring form without carrying the tension to the elastic limit.

In carrying out the process it is therefore desirable to adapt the design of the buffer somewhat to the desired cross-sectional dimensions, particularly the thickness, of the material to be used, having consideration for the elastic limits of the material.

As hereinabove suggested, one of the most important steps of the novel process of the present invention is the flexing of the strip from which the buffer is to be formed into ring form. The expression "ring form" is not necessarily understood to mean a perfect circular ring and may include other conical sections or approximations to conical sections and other annular forms, the particular shape of the ring depending somewhat, of course, upon the initial permanent bends made in the strip before it is flexed into ring form.

Figure 1:

If the steel strip is of uniform cross-sectional dimensions, a strip such as shown in Fig. 1, which is of such thickness that when flexed into ring form it will not be carried beyond its elastic limit, will form, when thus flexed, approximately a circular ring. There may be, however, a change of curvature at the point where the ends come together, which in the case of electric welding may extend a little distance each side of the weld.

This change of curvature may be avoided and an approximate circle generated by giving the strip initial end bends such as shown in Fig. 3, these bends being formed upon a radius substantially equal to the radius of the circle made by the strip when flexed into ring form.

As above suggested, although an approximation to exact circular formation would facilitate the performance of some of the succeeding steps, such an approximation is not rigorously essential to the obtaining of many of the advantages of the novel process of forming a buffer herein disclosed, and other open loop or ring forms will result in the obtaining of many of the advantages from the novel procedure hereinafter described.

Figure 4:
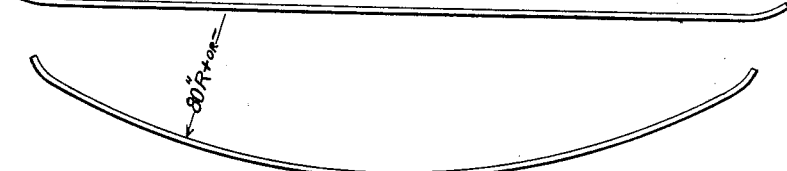
Fig. 4 illustrates the initial bends imparted to a strip when it is to be used for forming a buffer having a forwardly bowed front and when also the surface grinding is preferably to be done with the strip in ring form.
Figure 5:
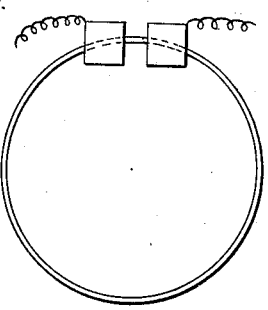
Fig. 5 illustrates the step of electrically welding the ends of the strip after it has been flexed into ring form, preparatory to the succeeding operations.
Figure 6:
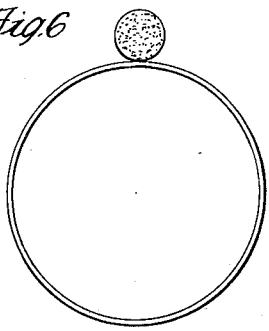
Fig. 6 illustrates the step of reducing the weld to approximately the cross-sectional dimensions of the remainder of the strip, this step being preferably performed by grinding rapidly so as incidentally to draw down or anneal some of the hardness resulting from the welding operation.
Figure 7:
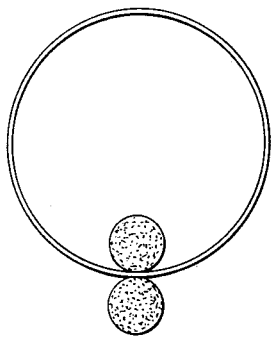
Fig. 7 illustrates one method of surface grinding the strip after it is formed into a ring.

The steel strip, whether it be the flat strip shown in Fig. 1, the strip having the permanent end bends shown in Fig. 3, or the strip shown in Fig. 4 for forming a forwardly bowed buffer, having been flexed into ring form the ends are welded together as for example by a flash weld or a butt weld, such as shown in Fig. 5. In either case there is usually a slight enlargement at the weld, which is then removed, as by grinding or other means, to restore this section of the ring to the same approximate cross-sectional dimensions as the remainder of the ring. The grinding down of the weld is preferably done on a dry wheel in order that the heat produced by the grinding operation may serve in part to draw some of the hardness produced by the welding heat and thus effect a slight annealing of the joint so as to reduce the internal strains therein.

Figure 8:
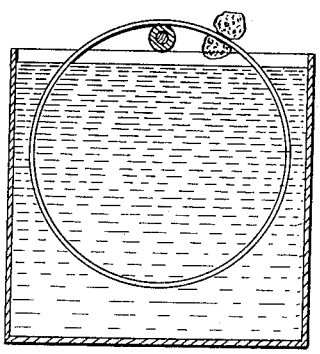
Fig. 8 illustrates one method of plating the strip while it is in ring form.

The weld having been reduced to the cross-sectional dimensions of the remaining parts of the strip or ring, the strip, if it has not been ground in its flat condition to remove the scale resulting from the hardening operation, is preferably then ground in ring condition. If both faces of the strip are to be finished, grinding may be effected simultaneously between two grinding wheels, as shown in Fig. 8. If only one face is to be finished, the outer face only of the ring is ground since this is the face that appears in the finished buffer.

Figure 9:
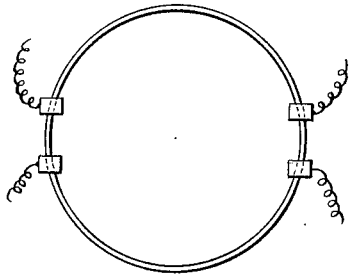
Fig. 9 illustrates a method of electrically heating diametrically opposed parts of the ring preparatory to elongation of the ring, and the formation of the permanent end bends or end folds.
Figure 10:
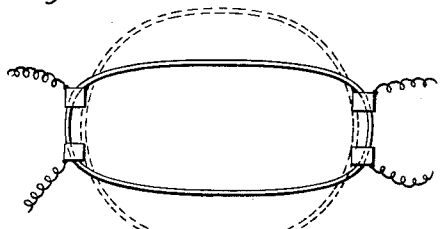
Fig. 10 illustrates a method of elongating the ring under the combined action of the stored-up tension in the sides due to flexing into ring form and the separating movement of the clamping members constituting the electrical contacts of the electrical heating means.

The surfaces of the strip having been prepared for plating, the plating may be done in the usual manner by immersing the whole ring in the plating solution, but is preferably done in such manner as to effect a substantially uniform distribution of the coating over the ring and to avoid a single point of support when acting as the cathode. As shown in Fig. 9, the plating may be done by immersing only a portion of the ring in the plating solution and slowly rotating it about its axis so that successive portions of the ring enter and leave the plating solution. By effecting the plating in this manner, the hydrogen bubbles which tend to form upon the ring are removed, either passing off as the ring comes into the air, or being brushed or wiped off, whereby a more ductile coating is formed upon the steel than by merely suspending the entire ring in the plating bath.

After the ring has been plated it may then be buffed. It is then ready for operation of forming it to the final shape of the buffer. In effecting this shaping, advantage is taken of the tension stored up in the strip when it was flexed into the ring form. If the buffer to be formed is of the end-fold type such as shown in Figs. 13 and 15, segments of the ring diametrically opposed to each other and of sufficient length to form the end folds are heated to a temperature sufficient to permit permanent bending thereof. This heating may be effected in any suitable manner as, for example, by including the portions to be heated in an electric circuit, the terminals of which engage the ring at each end of the portion to be heated.

When portions of the ring are heated in the manner just described to a temperature sufficient to permit and facilitate permanent bending to the desired final shape of the ends of the buffer, the sides of the ring between the heated portions tending constantly to come back to their original shape by reason of the tension stored up when the strip was flexed into ring form act, as soon as the heated portions have reached a sufficient temperature, to elongate the ring and relieve the sides of the tension put upon them in forming the ring. In order that advantage may be taken of this in the forming of the buffer, the terminals are preferably so mounted that each will rock about an axis to accommodate itself to the changing shape of the ring and are also so mounted that the two pairs of terminals can move away from each other as the elongation takes place so as to allow the ring to collapse.

Figure 11:
Fig. 11 illustrates the succeeding step of folding over the ends when forming a buffer of the end-fold type.

In forming the end folds as shown in Fig. 11 of the drawings, a combined twisting and folding action takes place which serves to bring the sides of the ring or the parts which are to form the buffer bars into substantially edge parallelism.

One of the portions of the ring which is heated to form the end folds will preferably include the weld, thus bringing this part of the integral buffer structure where any possible weakness in the weld will least injuriously affect the utility of the buffer.

In some cases buffers of the end-fold type have substantially straight buffer bars across the middle of the front, while the ends of the bars adjacent to the end folds are curved back from the straight lines to provide against hooking of the ends of the buffer against obstructions in backing the car as shown in Fig. 20. In forming a buffer of this configuration by the novel process of the present invention, it is desirable, in order to avoid heating too much of the ring, to form this rearward bend in the bar portions of the buffer before the formation of the ring. This may be done as shown in Fig. 19 of the drawings, by forming in the steel strip, before it is flexed into ring form, permanent bends to the radius of curvature desired in the finished buffer at its ends. For example, if the buffer bars are to have a rearward curvature adjacent to the end folds on a 20″ radius, a portion of the strip intermediate between the ends thereof is bent to this 20″ radius and at each of the ends a portion of substantially half the length of the intermediate bent portion is also bent to the 20″ radius of curvature and the ends are then welded together to form an approximately elliptical ring such as shown in Fig. 19. The successive operations upon this ring are then substantially the same as upon the circular ring.

Instead of forming a buffer with end folds, a buffer such as shown in Figs. 16 and 17 may be formed after the ring has been surface ground and plated and buffed, by simply heating portions, as in the formation of the end folds, and drawing the ring out into the elongated form shown in Fig. 17, while simultaneously bending rearwardly the two ends thereof.

In making the buffer shown in Fig. 22, which has edge bends at its ends, the process may be carried out in the same manner as in making the other forms of buffers herein shown up to the final shaping step. Instead, however, of folding or twisting the strip, or merely bending it sidewise as in forming the other buffers herein disclosed, the two halves of the ring, after diametrically opposite portions have been heated, are swung toward each other in such manner as to form an edgewise bend in each of the heated portions of the ring, this bend being sufficient to bring the bars into substantial parallelism, as shown in Fig. 22, the bending operation being illustrated in Fig. 21. As soon as the bending has been completed and the strip is released from the bending machine, the stored-up tension in the bar portions of the buffer straighten them to their original configuration, whether this be to the straight front form shown in Fig. 22 or to a bowed form similar to that shown in Fig. 15.

The heating of the parts of the ring which are to be bent to form the end folds, or otherwise permanently bent, and the subsequent exposure of the ends to the air, produces some discoloration of the plating of the strip throughout the heating operation. If desired, this discoloration may be avoided by dipping the heated end in a suitable oil, or some other cleaning solution such, for example, as water and glycerin, immediately after the bending operation. The discoloration due to heating and exposure to air is of a greenish hue which, in some cases, might produce an ornamental effect. If, however, this particular coloring is not desired and it is not desirable or convenient to dip the heated portion in a suitable cleaning solution after imparting the permanent bend thereto, the end, after bending, may be dipped in some suitable paint or enamel finish, such, for example, as Duco finish to effect the desired ornamentation thereof.

In some cases the process may be varied to the extent that the plating operation is performed after the buffer has been brought to its final configuration. If the plating is done after the final shaping of the buffer, the grinding is usually preferably done before this final shaping and therefore in heating the ends for the end-folding operation some scale will necessarily form upon the metal at these ends. In this case it is usually advisable to refinish the parts of the buffer that have been heated to obtain the best plating results.

It will be noted that the shaping of the steel strip from which the buffer is to be formed into a ring facilitates not only the performance of the succeeding steps upon the strip and its shaping into the final buffer form, but that this flexing of a strip into ring form in itself facilitates the final permanent bending operation, the tension put upon the strip in flexing it into ring form aiding in the elongation of the ring and also in the maintenance of the bar portions of the buffer in proper relation to the permanently bent portions at the ends during the bending operations.

It will also further be noted that when portions of the ring are heated preparatory to the final shaping operation, if one of these portions is made to include the weld the heating will tend to remove any local internal strains in the weld.

What I claim as new is:

1. The process of making integral double-bar automobile buffers which consists in taking a strip of steel of substantially the length required to form the buffer, flexing it into ring form, welding the ends together, finishing and plating the strip while in ring form, engaging substantially diametrically opposed portions of the ring and elongating the ring, and folding over the ends of the elongation to bring the sides into substantially edgewise parallelism.

2. The process of making integral double-bar automobile buffers which consists in shaping into ring form a strip of steel of substantially the length required to form the buffer, welding the ends together, finishing and plating the strip while in ring form, heating substantially diametrically opposed portions thereof sufficiently to facilitate bending, and elongating said ring and bending the heated portions thereof to bring the unheated portions into substantially edgewise parallelism.

3. The process of making integral double-bar automobile buffers which consists in shaping into ring form a strip of steel of substantially the length required to form the buffer, welding the ends together, finishing and plating a strip while in ring form, heating portions of the ring upon opposite sides thereof sufficiently to facilitate bending and elongating said ring, and bending the heated portions thereof to form the desired integral connections between the two bars of the buffer.

4. The process of making automobile buffers and other articles which comprises bending a strip of steel of the desired composition into the form of a ring having cross-sectional dimensions substantially the same as the corresponding dimensions of the strip, performing one or more operations on the ring to provide the same with a finished surface, and thereafter bending the ring into the desired shape.

5. The process of making automobile buffers and other articles, which comprises bending into ring form a strip of steel of the desired composition, performing one or more operations on the ring to provide the same with a finished surface, heating the ring at one or more points to the proper temperature for bending, and bending the ring into the desired shape.

6. The process of making automobile buffers and other articles, which comprises bending into ring form a strip of steel of the desired composition, finishing and plating one or more surfaces of the ring, heating the ring at one or more points to the proper temperature for bending, and bending the ring into the desired shape.

7. The process of making automobile buffers and other articles, which comprises bending a metallic strip into the form of a ring having cross-sectional dimensions substantially the same as the corresponding dimensions of the strip, securing the ends of the ring together, presenting the ring to devices for operating on the ring, rotating the ring with relation to said operating devices to transfer the point of operation about the ring, and thereafter bending the ring into the desired shape.

8. The process of making automobile buffers and other articles, which comprises bending a metallic strip into a form in which the surfaces are accessible for finishing and may be presented successively to devices for operating thereon by a rotative movement of said form, engaging the strip while in said form with abrading means for finishing a surface of the same, rotating the strip to transfer the point of operation about the same, and thereafter bending the strip from said form into the desired shape.

9. The process of making automobile buffers and other articles, which comprises flexing into ring form a relatively thick narrow strip of steel, heating at least portions of the ring to bending temperature, and bending the ring into the desired buffer or other shape.

10. The process of making automobile buffers and other articles, which comprises flexing into ring form a relatively thick narrow strip of steel, securing the ends of the ring together heating at least portions of the ring to bending temperature, and elongating said ring.

11. The process of making automobile buffers and other articles, which comprises bending a strip of steel into ring form, securing the ends of the ring together heating at least portions of the rings to bending temperature, and elongating the ring and bending the ends thereof to bring the sides substantially into edgewise parallelism.

12. The process of making integral double-bar automobile buffers which comprises flexing into ring form a strip of steel of substantially uniform cross-section, welding the ends of the strip together, heating at least portions of the ring sufficiently to permit permanent bending thereof and elongating the ring and bending the ends of the elongated ring into the desired shape.

13. The process of making automobile buffers which comprises taking a strip of steel of substantially uniform cross-section, bending the strip into a ring, welding the ends of the ring together, reducing the weld to substantially the cross-sectional dimensions of the remainder of the strip, plating the strip, heating at least portions of the ring sufficiently to permit permanent bending thereof, and elongating the ring and bending the same into the desired shape.

14. The process of making integral double-bar automobile buffers which comprises flexing into ring form a strip of steel of substantially uniform cross-section, welding the ends together, heating at least portions of the ring to permit permanent bending thereof, and elongating the ring and bending the ends thereof to bring the sides substantially into edgewise parallelism.

15. The process of making an integral double-bar buffer which consists in flexing into ring form a strip of steel of substantially uniform cross-section, welding the ends together, finishing, plating and buffing the ring, heating at least portions of the ring sufficiently to permit permanent bending, and bending the same into the desired shape.

16. The process of making integral double-bar buffers which consists in shaping into ring form a strip of steel, welding the ends together and finishing and plating the strip while in ring form, heating at least portions of the ring sufficiently to facilitate bending, and elongating the ring and bending the same to bring the sides into substantially edgewise parallelism.

17. The process of making a double-bar bumper which comprises bending a relatively thick narrow strip of steel into the form of a ring having an annular length substantially the same as the length of the strip, welding the ends of the strip together, and elongating the ring.

18. The process of making a double-bar bumper which comprises bending a flat strip of steel into ring form, welding the ends of the strip together, and elongating the ring and bending the strip to bring the sides of the elongated ring into edge-to-edge and substantially parallel relations.

19. The process of making a double-bar buffer which comprises bending a metallic strip having a thickness and width suitable to form buffer bars into ring form, elongating the ring and bending the same into buffer shape.

20. The process of making automobile buffers which comprises bending a relatively thick narrow metallic strip suitable to form buffer bars into ring form and thereafter bending the ring into the desired buffer shape.

21. The process of making double-bar automobile buffers which comprises bending a relatively thick narrow metallic strip suitable to form buffer bars into ring form and elongating the ring to form two buffer bars.

22. The process of making a double-bar automobile buffer comprising bending a relatively thick narrow metallic strip suitable to form buffer bars into ring form and thereafter bending the ring to bring portions of the strip into substantially parallel relations, and thereby form parallel buffer bars.

23. The process of making automobile buffers which comprises bending a relatively thick narrow metallic strip suitable to form buffer bars into ring form, performing one or more operations on the ring and thereafter bending the ring into the desired buffer shape.

24. A process of making automobile buffers which comprises finishing one or more surfaces of a relatively thick narrow strip of steel suitable to form buffer bars, heating at least portions of the strip to bending temperature and bending the strip into the desired form.

25. A process of making automobile buffers which comprises plating one or more surfaces of a relatively thick narrow strip of steel suitable to form buffer bars, heating at least portions of the strip to bending temperatures and bending the strip into the desired form.

26. The process of making automobile buffers which comprises bending a metallic strip into ring form, presenting the ring to devices for operating on the ring, and rotating the ring to transfer the point of operation about the ring.

27. The process of making automobile buffers which comprises bending a metallic strip into substantially endless annular form, relatively placing the strip and devices for operating on the strip into operating relation, and relatively rotating the strip and said devices to transfer the point of operation along the strip.

Signed at New York city, New York, this 17th day of October, 1924.

GEORGE ALBERT LYON.